US008924808B2

(12) United States Patent
Liu et al.

(10) Patent No.: US 8,924,808 B2
(45) Date of Patent: Dec. 30, 2014

(54) CELL DEPENDENT MULTI-GROUP HYBRID AUTOMATIC REPEAT METHOD FOR MULTICAST IN WIRELESS NETWORKS

(71) Applicant: Thomson Licensing, Issy de Moulineaux (FR)

(72) Inventors: Hang Liu, Yardley, PA (US); Huanqiang Zhang, Beijing (CN); Xiao-jun Ma, Beijing (CN); Mingquan Wu, Princeton Junction, NJ (US); Jun Li, Cranbury, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/953,899

(22) Filed: Jul. 30, 2013

(65) Prior Publication Data
US 2013/0315126 A1    Nov. 28, 2013

Related U.S. Application Data

(62) Division of application No. 12/995,587, filed on Dec. 1, 2010, now Pat. No. 8,656,241.

(30) Foreign Application Priority Data

Jun. 4, 2008    (EP) .................................... 08305230
May 27, 2009    (WO) ............... PCT/US2009/003226

(51) Int. Cl.
*H04L 1/18*    (2006.01)
*G08C 25/02*    (2006.01)
*H04W 4/06*    (2009.01)
*H04L 1/00*    (2006.01)
*H04W 8/26*    (2009.01)

(52) U.S. Cl.
CPC ............... *H04W 4/06* (2013.01); *H04L 1/1848* (2013.01); *H04L 1/188* (2013.01); *H04L 1/1819* (2013.01); *H04L 2001/0093* (2013.01); *H04W 8/26* (2013.01)
USPC ................. 714/748; 714/1; 714/4.1; 370/390

(58) Field of Classification Search
CPC ..................... H04L 2001/0093; H04L 1/0061; H04L 1/1812; H04L 1/1825; H04L 12/1881; H04L 1/0009; H04L 1/0017; H04L 65/4076; H04L 67/06; H04L 67/325
USPC ........... 714/748–751, 4.1, 768, E11.001, 746, 714/776; 370/390; 709/219, 227
See application file for complete search history.

(56) References Cited

U.S. PATENT DOCUMENTS 8,250,426 B2    8/2012    Larsson
8,656,241 B2    2/2014    Liu et al.
(Continued)

FOREIGN PATENT DOCUMENTS

EP    1178627    2/2002
JP    2002124935    4/2002
(Continued)

*Primary Examiner* — Guy Lamarre
(74) *Attorney, Agent, or Firm* — Robert D. Shedd; Jeffrey M. Navon; Catherine A. Cooper

(57) ABSTRACT

A method and apparatus are described including determining address using an access point address and a multicast group address, transmitting a recovery request message to a recovery server to request recovery data using the address and receiving the recovery data from the recovery server. Also described are a method and apparatus including receiving a registration message, transmitting a reply to the registration message, receiving a recovery request message, transmitting recovery data responsive to the recovery request message and transmitting a message to a recovery multicast group to determine status of the recovery multicast group.

11 Claims, 9 Drawing Sheets

(56) References Cited

U.S. PATENT DOCUMENTS

| | | |
|---|---|---|
| 2002/0028687 A1 | 3/2002 | Sato et al. |
| 2003/0031175 A1 | 2/2003 | Hayashi et al. |
| 2007/0258466 A1 | 11/2007 | Kakani |
| 2008/0184087 A1* | 7/2008 | Hayashi ........................ 714/751 |
| 2009/0327842 A1 | 12/2009 | Liu et al. |
| 2010/0260180 A1 | 10/2010 | Wu et al. |

FOREIGN PATENT DOCUMENTS

| | | |
|---|---|---|
| JP | 2002199013 | 7/2002 |
| JP | 2004201111 | 7/2004 |
| JP | 2006067498 | 3/2006 |
| JP | 2006067499 | 3/2006 |
| WO | WO2007122503 | 11/2007 |
| WO | WO2008013528 | 1/2008 |

* cited by examiner

CELL DEPENDENT MULTI-GROUP HYBRID AUTOMATIC REPEAT METHOD FOR MULTICAST IN WIRELESS NETWORKS

This application is a divisional of co-pending U.S. application Ser. No. 12/995,587, filed Dec. 1, 2010, herein incorporated by reference.

This application claims priority to European patent application Serial No. EP 08305230.8, filed on Jun. 4, 2008 and entitled "STREAMING DATA PAUSE FUNCTIONS", incorporated herein by reference.

FIELD OF THE INVENTION

The present invention relates to wireless communications and, in particular, to a method for cell-dependent retransmission of data.

BACKGROUND OF THE INVENTION

Interest in and demand for wireless multimedia applications are growing rapidly. Multicast over wireless networks enables efficient distribution of data including but not limited to multimedia data and entertainment programs (video, audio, file and text) to many receivers simultaneously. However, multimedia data delivery requires high reliability and bandwidth efficiency. Wireless links are unreliable with time-varying and burst link errors. Especially in multicast applications, different receivers of the same program may experience heterogeneous channel conditions and receivers may leave or join during the session so that the topology of receivers changes. There is no link layer retransmission and no link layer adaptation for multicast in many wireless networks, for example, current IEEE 802.11 networks. A wireless device may be handed off from one access point (AP)/base station (BS) to another. As used herein, "/" denotes alternative names for the same or similar components or structures. That is, a "/" can be taken as meaning "or" as used herein. A wireless device includes laptops, dual mode smart phones, personal digital assistants (PDAs), end devices, clients, client devices, mobile devices mobile terminals, multicast clients, multicast client devices, receivers etc. Data frame transmission is interrupted and a number of data packets are lost to the receiver during periods of handoff. Furthermore, multiple wireless APs/BSs are connected to a multicast server/source via a high speed wired network. The channel conditions of the clients in one cell may be dramatically different from the channel conditions of clients in another cell.

A unicast communication is a one-to-one communication between two entities. A broadcast communication is a communication between one and all other entities in the communication system. A multicast communication is a one-to-many communication between an entity and a plurality of other entities in the communication system, where the plurality of other entities may include all other entities in the communications system. In many wireless multicast systems, the forward error correction codes (FEC) are used within a packet at the physical layer to protect against multi-path fading and interference and to reduce the packet errors. To recover the lost packets in wireless networks, the FEC codes are also applied across packets at the transport and application layers. However, the wireless channel conditions are time-varying and the multiple clients in multicast networks experience heterogeneous channel conditions. The FEC codes are normally used according to the worst channel conditions to ensure the receiving quality of all the receivers in the desired service area. This results in a large overhead and requires a great deal of radio resources for retransmission. Another technique to improve reliability is to use retransmission of lost packets, also called Automatic Repeat reQuest (ARQ). In a multicast scenario, ARQ is not very efficient. For example, if client A loses packet 1 and client B loses packet 2. The source/server retransmits both packet 1 and packet 2.

In some reported multicast systems, a hybrid ARQ scheme is described, which combines ARQ and FEC and is more efficient than pure ARQ. The retransmitted packets in hybrid ARQ are the parity packets generated by a FEC code, which can be used to correct different lost information packets by different receivers. For example, client A loses packet 1 and client B loses packet 2 and if a Reed-Solomon FEC code is used to generate the parity packets with cross-packet erasure coding, the source/server only needs to retransmit/multicast one FEC parity packet. Client 1 can use the retransmitted FEC parity packet to recover packet 1 and Client B can use the same FEC parity packet to recover packet 2.

However, in the previous multicast ARQ or hybrid ARQ schemes, the retransmitted packets are sent in a single multicast group, either the same multicast group as the source data packets or a separate multicast group. Multiple receivers may experience time-varying and heterogeneous channel conditions. If one receiver in a particular cell requests a lot of retransmitted packets, these retransmitted packets will be sent multicast in all the wireless cells even though the receivers in other cells do not need so many retransmitted packets. This method, thus, wastes the radio bandwidth of the other cells.

Scalability in terms of the number of APs/BSs and the number of clients is an important issue to resolve. It would be advantageous to have a reliable and scalable wireless multicast system and that efficiently utilizes the wireless bandwidth.

SUMMARY OF THE INVENTION

Described herein is a multi-group hybrid Automatic Repeat reQuest (ARQ) (also called recovery herein) method for reliable multicast over infrastructure/cellular wireless networks. The hybrid ARQ method of the present invention automatically assigns a multicast group to the wireless devices associated with an access point (AP)/base station (BS) or in a wireless cell for cell-dependent control message exchanges including, for example, sending the ARQ request and receiving retransmitted packets. The control messages and retransmitted data for the multicast clients in one cell will not be transmitted by other APs/BSs over the wireless links in other cells. In this way, the wireless bandwidth used for retransmission in one cell is adapted to the channel conditions of the multicast clients in this cell and is not impacted by the channel conditions of the multicast clients in other cells.

A method to automatically assign a multicast address to a cell for cell-dependent control message exchanges and ARQ/retransmission, called ARQ multicast group, and to advise the ARQ/recovery server of the assigned multicast address of the ARQ multicast group is also described. Furthermore, the present invention describes the method that the ARQ server joins a cell-dependent ARQ multicast group for a cell when the ARQ multicast group is needed and leaves the ARQ multicast group after the ARQ multicast group is terminated.

A method and apparatus are described including associating with an access point, obtaining an address of the access point, obtaining a multicast group address and determining a recovery multicast address using the access point address and the multicast group address. Also described are a method and apparatus including transmitting a request to join a multicast group, transmitting a request to join a recovery multicast group, transmitting a registration message to a recovery server, receiving multicast data, determining if any data has been lost, determining if another device has transmitted a recovery request message, generating the recovery request message, if no other device has transmitted the recovery request message, determining if a registration reply message has been received from the recovery server, determining if any retransmitted data has been received previously and unicasting the recovery request message to the recovery server if no retransmitted data has been previously received. Further described are a method and apparatus including receiving a recovery multicast group message from a recovery server, determining if a device is a member of a recovery multicast group, transmitting a reply to the recovery multicast group message.

A method and apparatus are described including determining address using an access point address and a multicast group address, transmitting a recovery request message to a recovery server to request recovery data using the address and receiving the recovery data from the recovery server. Also described are a method and apparatus including receiving a registration message, transmitting a reply to the registration message, receiving a recovery request message, transmitting recovery data responsive to the recovery request message and transmitting a message to a recovery multicast group to determine status of the recovery multicast group.

BRIEF DESCRIPTION OF THE DRAWINGS

The present invention is best understood from the following detailed description when read in conjunction with the accompanying drawings. The drawings include the following figures briefly described below where like-numbers on the figures represent similar elements.

DETAILED DESCRIPTION OF THE PREFERRED EMBODIMENTS

Figure 1:
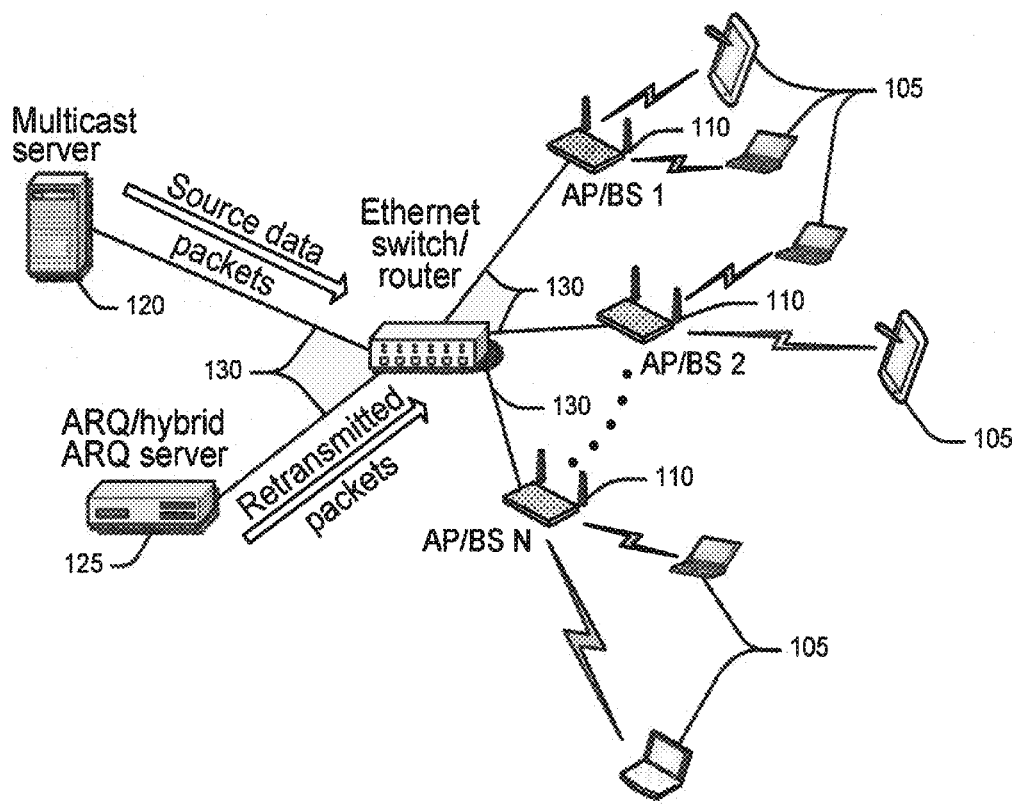
FIG. 1 is a schematic diagram of an exemplary multicast system such as used in accordance with and to describe the method of the present invention.

FIG. 1 is a schematic diagram of an exemplary multicast system such as used in accordance with and to describe the method of the present invention. The wireless devices/clients/receivers 105 are connected to a multicast server 120 (e.g. a video streaming server) through wireless access points (AP)/base stations (BS) 110 and a high-speed wired access network 130 (e.g. Ethernet) having an Ethernet switch/router 115. An access point 110 serves a cell. There may be many multicast receivers/clients 105 in a cell. The multicast server/video streaming server 120 is connected to multiple APs/BSes 110 via the high-speed wired network 130 and serves multiple cells to increase the service area. To reduce the interference, the adjacent wireless access points may operate using different frequency carriers. The server 120 sends multicast source data packets (e.g. compressed video data packets) to multiple APs/BSes 110 and each AP/BS 110 transmits the source data packets to a number of the clients 105 in its cell in multicast.

Figure 2:
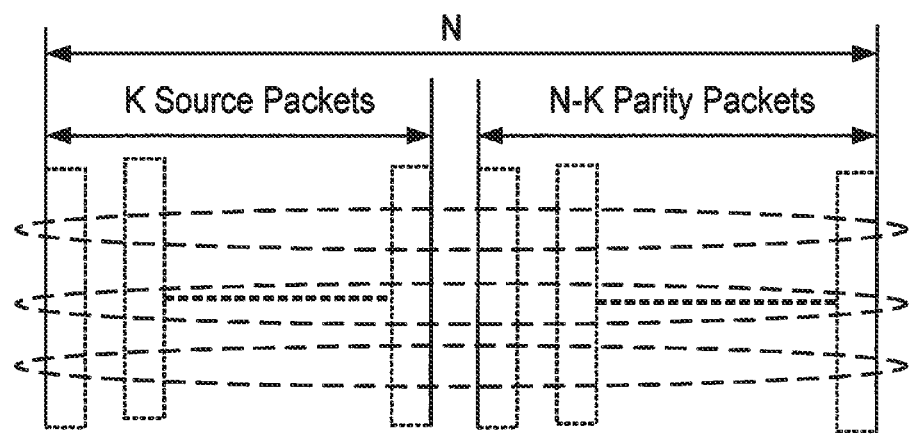
FIG. 2 is an example of FEC coding.

The ARQ/hybrid ARQ server 125 is also connected to the high-speed Ethernet LANs 130 through Ethernet switch/router 115. The ARQ server obtains the source packets from the multicast server via Ethernet switch/router 115. The ARQ server 125 includes, among others components, a FEC encoder and an ARQ handler. The FEC encoder applies cross-packet FEC coding to the source packets and generates the FEC parity packets. The ARQ handler is responsible for retransmission of FEC parity packets or source packets based on the request from the receivers. The FEC used can be any systematic forward correction code, for example, Reed-Solomon (RS) codes. The FEC code is used across the packets to protect against loss (erasure) of an entire source packet because the erroneous packets are often discarded by the lower layer of the protocol. For example, as shown in FIG. 2, a (N, K) RS code is applied to K source/information packets to form H=(N-K) parity packets. Each parity packet can recover one lost source packet at the receiver no matter which source packet is lost out of the K information packets. In an alternative embodiment, the ARQ server 125 of FIG. 1 is collocated with the multicast server 120 of FIG. 1.

In multicast, multiple receivers of the same video stream may experience different packet loss rates due to different channel conditions at the same time. The same receiver may also experience different packet loss rates at different times. New receivers may join during the session or some receivers may leave so that the topology of the receivers changes. For a multicast program, the channel conditions of the clients in one cell may be significantly different from that of the clients in another cell. The hybrid ARQ method of the present invention is a method for reliable multicast over infrastructure/cellular wireless networks. The hybrid ARQ method of the present invention automatically assigns a multicast group and multicast group address to the wireless devices associated with an access point (AP)/base station (BS) or in a wireless cell for cell-dependent control message exchanges, such as sending the ARQ request and receiving retransmitted FEC parity packets and/or source data packets. The retransmitted data for the receivers/clients in one cell will not be transmitted by other APs/BSs over the wireless links in other cells. In this way, the wireless bandwidth used for retransmission in one cell is adapted to the channel conditions of the multicast clients in this cell and is not impacted by the channel conditions of the multicast clients in other cells.

In the present invention, a method to automatically assign the multicast address to a cell for cell-dependent control message exchange and ARQ/retransmission, called ARQ multicast group, and to advise the ARQ server of the assigned multicast address of the ARQ multicast group is also described. Furthermore, the present invention describes the method for the ARQ server to join a cell-dependent ARQ multicast group for a cell when the ARQ multicast group is needed and to leave the ARQ multicast group after the ARQ multicast group is terminated.

The method and system described herein can be used in multicast applications over wireless local area networks (WLAN), 3G networks, WiMax, or other wireless networks although the IEEE 802.11 WLAN networks are used as an example to describe the adaptive FEC method and system of the present invention. Furthermore, the present invention is independent of the type of data that is being transmitted, and can be used for multicast of any type of data, and is not limited to audio/video programs although video multicast is used as an example to describe the method of the present invention. The present invention can be used to retransmit the FEC parity packets and/or source packets.

For reliable multicast, the server transmits multicast source data packets of a program to the clients in a multicast group, for example multicast group X. A client that desires to receive the source data joins/subscribes to multicast group X by sending a request to the BS/AP with which the client is associated. The BS/AP transmits the data for multicast group X over wireless links in its cell as long as any client in the cell is a member of multicast group X. If no client associated with a BS/AP wants the data for a particular multicast group, i.e. wants to be a member of a particular multicast group and receive the data destined for that multicast group, the BS/AP will not transmit the data for that particular multicast group in its wireless cell, but discards the data. An BS/AP may periodically query the clients associated with it whether any client is still a member of a particular multicast group. The Internet Multicast Management Protocol (IGMP) or other protocols can be used as a means by which the client can join or leave a particular multicast group via a request to the BS/AP.

An alternative embodiment is that the client can send a request to the Ethernet switch/router indicating that the client wishes to join or leave a multicast group, the Ethernet switch/router will not transmit the data for that multicast group to the BS/AP.

In addition, the clients of multicast program X in cell 1 join a multicast group 1X to send the ARQ request to the ARQ/hybrid ARQ server and receive the retransmitted FEC parity packets or source packets from the ARQ/hybrid ARQ server in order to recover lost packets of multicast program X. In general, the clients of multicast program X in cell N join a multicast group NX to send the ARQ request to the ARQ/hybrid ARQ server and receive the retransmitted FEC parity packets or source packets from the ARQ/hybrid ARQ server to recover lost packets of multicast program X. Multicast groups 1X, 2X . . . NX . . . are different multicast groups with different multicast addresses. The ARQ server sends retransmitted FEC parity or source packets to multicast group 1X for the clients in cell 1, 2X for the clients in cell 2, . . . NX for the clients in cell N. All the source packets and retransmitted packets are transmitted to the Ethernet switch/router over the high-speed wired network. Source data in multicast group X, as well as the ARQ request and retransmited data in multicast group 1X, is transmitted in cell 1 because the clients in cell 1 are members of multicast groups X and 1X. However, the ARQ request and retransmitted data for other groups (2X, . . . , NX, . . . ) is not transmitted in cell 1 because clients in cell 1 are not members of multicast groups 2X . . . , NX, . . . . The data for other groups are discarded by cell 1, AP/BS or the Ethernet switch/router as described above. In this way, the wireless bandwidth is adapted to the multicast clients in cell 1. Similarly, the source data in multicast group X as well as the ARQ request and retransmited data in multicast group NX is transmitted in cell N. The ARQ request and retransmitted data in other groups (1X, . . . , (N−1)X, . . . (N+1)X, . . . ) is not transmitted in cell N. Therefore, the wireless bandwidth used for retransmission in a cell only depends on the channel conditions of the clients in that cell, not the channel conditions of the clients in other cells.

The multicast addresses for the multicast source data as well as the ARQ request and retransmited data need to be known by the clients in a cell, the multicast server and the ARQ server. The present invention further describes a method to assign the multicast addresses. A 32 bit IP v4 address is used as an example to explain the address assignment method of the present invention. The method of the present invention can easily be extended to the assignment of a 128 bit IP v6 address or layer 2 MAC address.

For a multicast program X, a 32-bit IP v4 multicast address $bx(31), bx(30), \ldots bx(m+1), bx(m), bx(m-1) \ldots bx0$, ($bx(m)$ is the mth bit of the address, $0<m<31$), is assigned for source data transmission, called source data multicast group, in which $bx(31) \ldots bx(m+1)$, $bx(m)$ are either 1 or 0, and $bx(m-1), \ldots b0$ are equal to 0. The source data address for multicast program X can be configured at the multicast server, the ARQ server and the clients. In an alternative method, the source data multicast group address for multicast program X can be included in a Session Description File (SDF). The SDF file can be downloaded by the client through the HyperText Transfer Protocol (HTTP) or Real-Time Streaming Protocol (RTSP) at the session start or announced by the multicast server or a separate directory server (not shown in FIG. 1.) via the session announcement protocol (SAP) protocol.

In the present invention, each cell has a separate cell-dependent multicast address for control message exchange (e.g. ARQ request and retransmission for program X) called herein an ARQ multicast address. The ARQ multicast address for a program X in a cell N is decoded from the source data multicast group address of program X and the media access control (MAC) address or the IP address of the AP/BS for cell N. If the MAC address of cell N AP/BS is MAC_N, the least significant m bits of the ARQ multicast address for a program X in a cell N is a hash function of the MAC address of cell N AP/BS, as shown in Equation 1.

$$\{dxn(m-1), dxn(m-2), \ldots dxn(0)\}=\text{Hash}(MAC\_N). \quad (1)$$

If Hash(MAC_N)=0, $dxn(0)$ is set to be 1 in order to avoid the same address as the source data multicast address of program X.

In an alternative embodiment, the least significant m bits of the ARQ multicast address for a program X in a cell N is a hash function of the IP address, IP_N, of cell N AP/BS, as shown in Equation 2.

$$\{dxn(m-1), dxn(m-2), \ldots dxn(0)\}=\text{Hash}(IP\_N). \quad (2)$$

If Hash(IP_N)=0, $dxn(0)$ is set to be 1 in order to avoid the same address as the source data multicast address of program X.

In another alternative embodiment, the least significant m bits of the ARQ multicast address for a program X in a cell N is equal to the least significant m bits of its AP/BS MAC address MAC_N or IP address IP_N.

The most significant (32-m) bits of the ARQ multicast address for a program X are equal to the most significant (32-m) bits of the source data multicast address for the program X, i.e. dxn(31)=bx(31), dxn(30)=bx(30), . . . , dxn(m)=bx(m).

Figure 3:
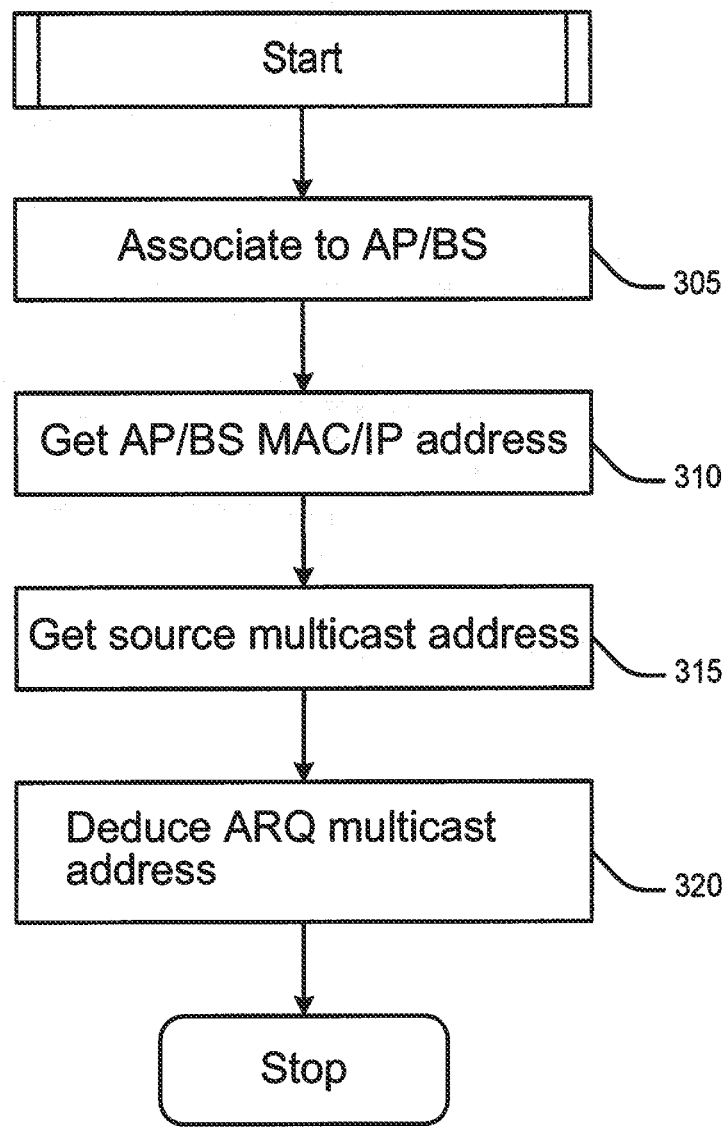
FIG. 3 is a flowchart depicting an exemplary method in accordance with the principles of the present invention for a client to obtain the ARQ multicast address for a program X.

FIG. 3 is a flowchart depicting an exemplary method for a client to obtain the ARQ multicast address for a program X. A client associates with an AP/BS at 305 in order to receive the multicast data/content/program and obtains the MAC address or the IP address of the AP/BS at 310. the client then obtains the source data multicast group address of program X through configuration or session description file downloaded from a directory server, or an announcement from the directory server at 315. The client then decodes the ARQ multicast address of program X at 320 from the source data multicast address of program X and the MAC address or the IP address of the AP/BS as described above.

The ARQ multicast address of program X needs to be known by the ARQ server in order to receive the ARQ request from the client and to retransmit FEC parity packets or source packets. The ARQ server may not know the IP and/or MAC addresses of the APs/BSs and cannot decode the ARQ multicast address from the IP and/or MAC address of the APs/BSs. Furthermore, the IP and/or MAC addresses of the APs/BSs may change, for example, if a new AP/BS is added or if an existing AP/BS is removed or an existing AP/BS is replaced by another AP/BS with a different MAC address, so that the ARQ multicast group of the ARQ multicast addresses used for a cell by the clients. Furthermore, the present invention describes the method by which the ARQ server joins the ARQ multicast groups when the ARQ multicast groups are needed and leaves the ARQ multicast groups after the ARQ multicast groups are terminated (this is an example of the MAC address of the AP/BS changing).

Figure 4:
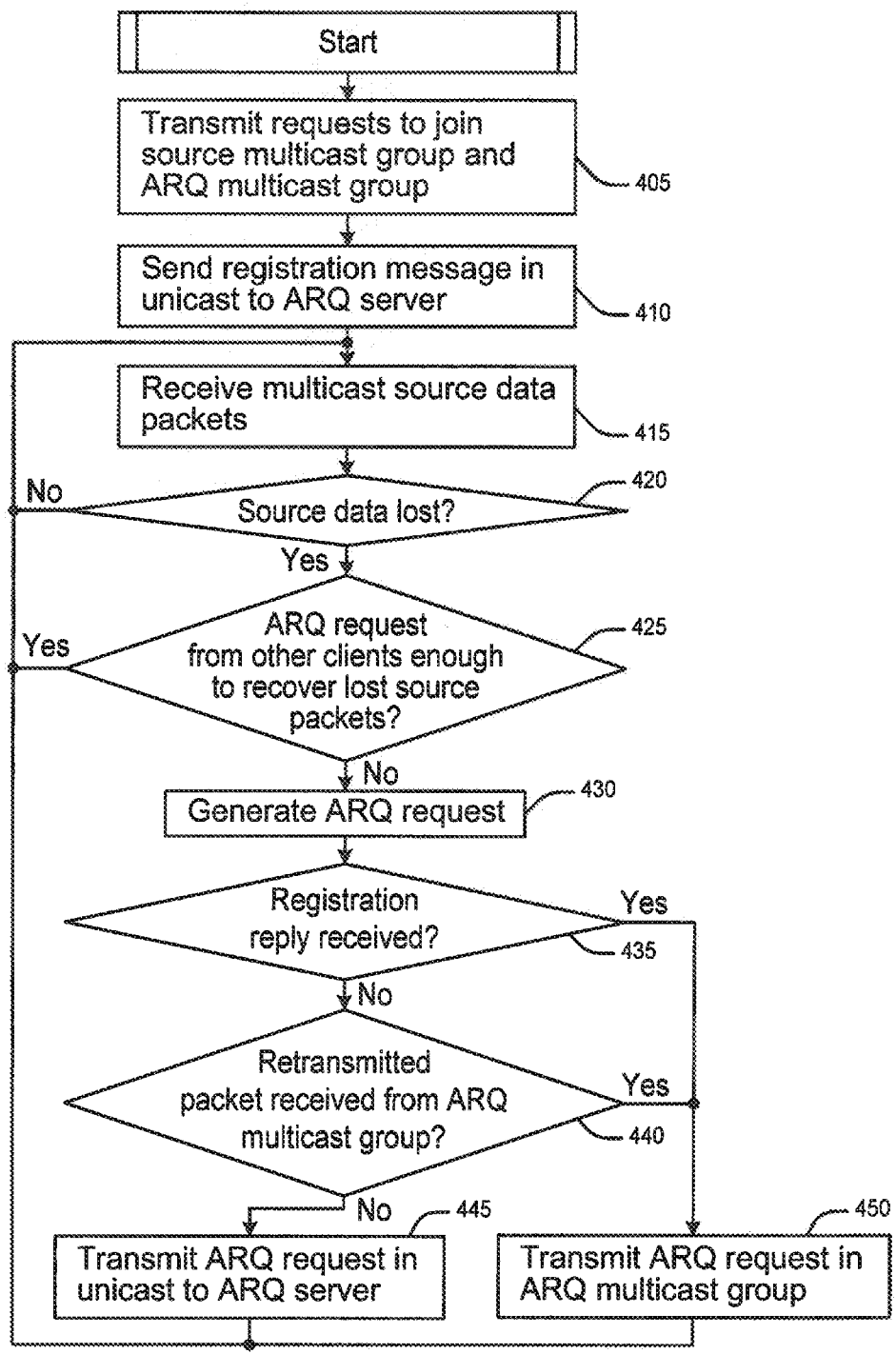
FIG. 4 is a flowchart illustrating an exemplary method in accordance with the principles of the present invention for a client to register with an ARQ server and send the ARQ server a request to receive packets (FEC and/or source) from the ARQ server.

FIG. 4 is a flowchart illustrating an exemplary method for a client to register with an ARQ server and send the ARQ server a request to receive packets (FEC and/or source) from the ARQ server. At 405 the client sends a request to join the source data multicast group and the ARQ multicast group by sending the request to the BS/AP or the Ethernet switch/router. The client's request to join the source data multicast group and the ARQ multicast group uses IGMP. The client then sends a registration message in unicast to the ARQ server at 410. The registration message contains the message ID, the address of the client, the address of the AP/BS with which the client is associated, the address and the port of the source data multicast group, the address and the port of the ARQ multicast group. The client receives the source data of program X from the source data multicast group at 415. If the client detects that some source data packets are lost at 420 and the client does not detect an ARQ request from other clients that requested the retransmission of FEC parity packets and/or source packets that can be used to recover the lost source packets at 425, the client may generate an ARQ request at 430. The client then performs a test at 435 to determine if the client has received a registration reply from the ARQ server. The registration reply message contains the address of the ARQ server and the address of the client. If the client has not received a registration reply, then the client performs a test at 440 to determine if the client has previously received retransmitted packets from the ARQ multicast group. If the client has not previously received retransmitted packets from the ARQ multicast group then the client unicasts the ARQ request for retransmission of the packets (FEC and/or source packets) to the ARQ server at 445. The ARQ request is sent in unicast to the ARQ server if the client has not received the registration reply message from the ARQ server and if the client has not received any retransmitted packet from the ARQ server in the ARQ multicast group. Processing proceeds to 415. If the client has previously received retransmitted packets from the ARQ multicast group then the client multicasts the ARQ request for retransmission of the packets (FEC and/or source packets) to the ARQ server at 450. Processing proceeds to 415. If the client has received a registration reply (at 435), then processing proceeds to 450. If the client detected ARQ requests from other clients (at 425) for enough packets to recover the packets that the client lost the processing proceeds to 415. If the client did not detect any lost packets (at 420) then processing proceeds to 415.

The ARQ request message contains message ID, message type, round ID, source multicast address and port, ARQ multicast address and port, the source coding block ID or the base sequence number (the sequence number of the first source packet) of the source coding block, the number of requested retransmission parity packets, the average number of lost source data packets in the source coding block, the length of the packet bitmap, the packet bitmap of the block, etc. The message type field indicates ARQ request for source data retransmission or FEC parity retransmission, or both source data and FEC parity retransmission. The round ID indicates the number of the ARQ round during which the message was sent. For all receivers, the round ID of each FEC coding block starts with the value 0. The packet bitmap of the block indicates the status of received source packets in the source coding block, in which a bit with value 1 denotes the corresponding source packet was correctly received, and a bit 0 denotes the packet was lost. Note that the source multicast address and ARQ multicast address above may be IP (layer 3) address and/or MAC (layer 2) address.

Figure 5:
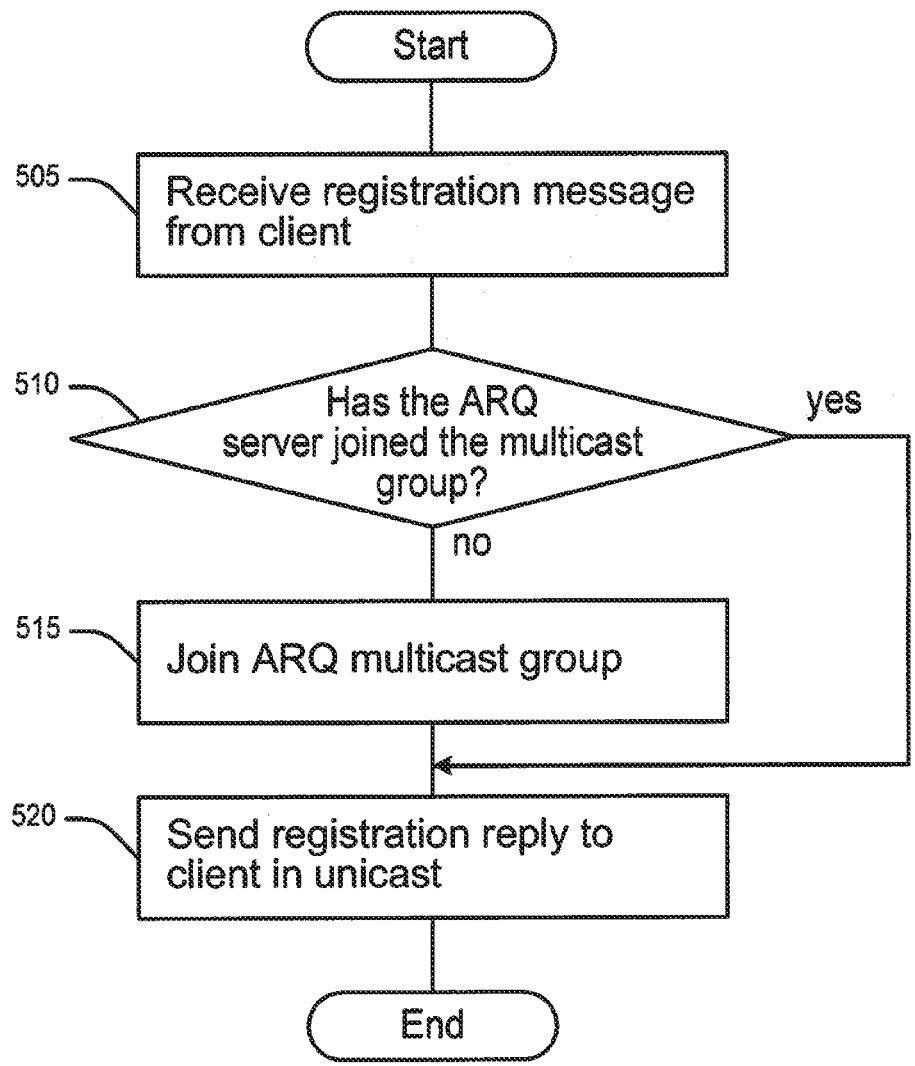
FIG. 5 is a flowchart depicting an exemplary method in accordance with the principles of the present invention for an ARQ server to process a registration message received from a client.

FIG. 5 is a flowchart depicting an exemplary method in accordance with the principles of the present invention for an ARQ server to process a registration message received from a client. The ARQ server receives a registration message from a client at 505. As soon as the ARQ server receives a registration message from a client, a test is performed at 510 to determine if the ARQ server has already joined the ARQ multicast group. If the ARQ server has not joined the ARQ multicast group specified in the registration message the ARQ server joins the ARQ multicast group specified in the registration message at 515. The ARQ server then sends a registration reply message in unicast to the client after it joins the ARQ multicast group at 520. If the ARQ server has already joined the ARQ multicast group specified in the registration message then processing proceeds to 520.

Figure 6:
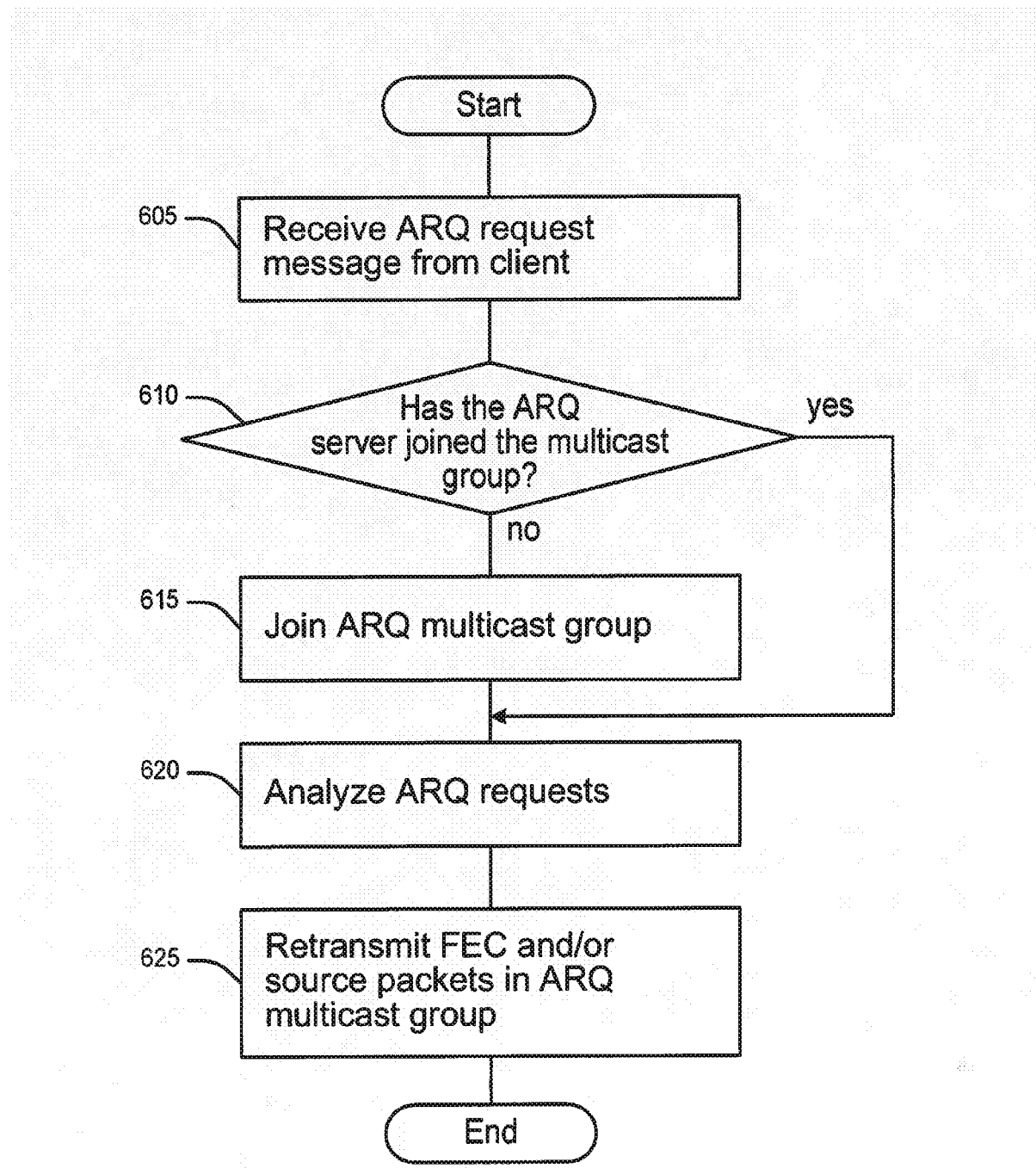
FIG. 6 is a flowchart illustrating an exemplary method in accordance with the principles of the present invention for an ARQ server to process an ARQ request message received from a client.

FIG. 6 is a flowchart depicting an exemplary method in accordance with the principles of the present invention for an ARQ server to process an ARQ request message received from a client. The ARQ server receives an ARQ request message from a client at 605. As soon as the ARQ server receives an ARQ request message from a client, a test is performed at 610 to determine if the ARQ server has already joined the ARQ multicast group. If the ARQ server has not joined the ARQ multicast group specified in the ARQ request message the ARQ server joins the ARQ multicast group specified in the ARQ request message at 615. The ARQ server analyzes the ARQ request messages received from the clients in a wireless cell at 620. Based on the ARQ request messages from the clients in a cell, the ARQ server retransmits the FEC parity packets and/or original source packets in the ARQ multicast group specified in the ARQ request at 625. Note that the retransmitted FEC parity packets and/or original source packets for different cells are retransmitted in multicast in different ARQ multicast groups.

Figure 7:
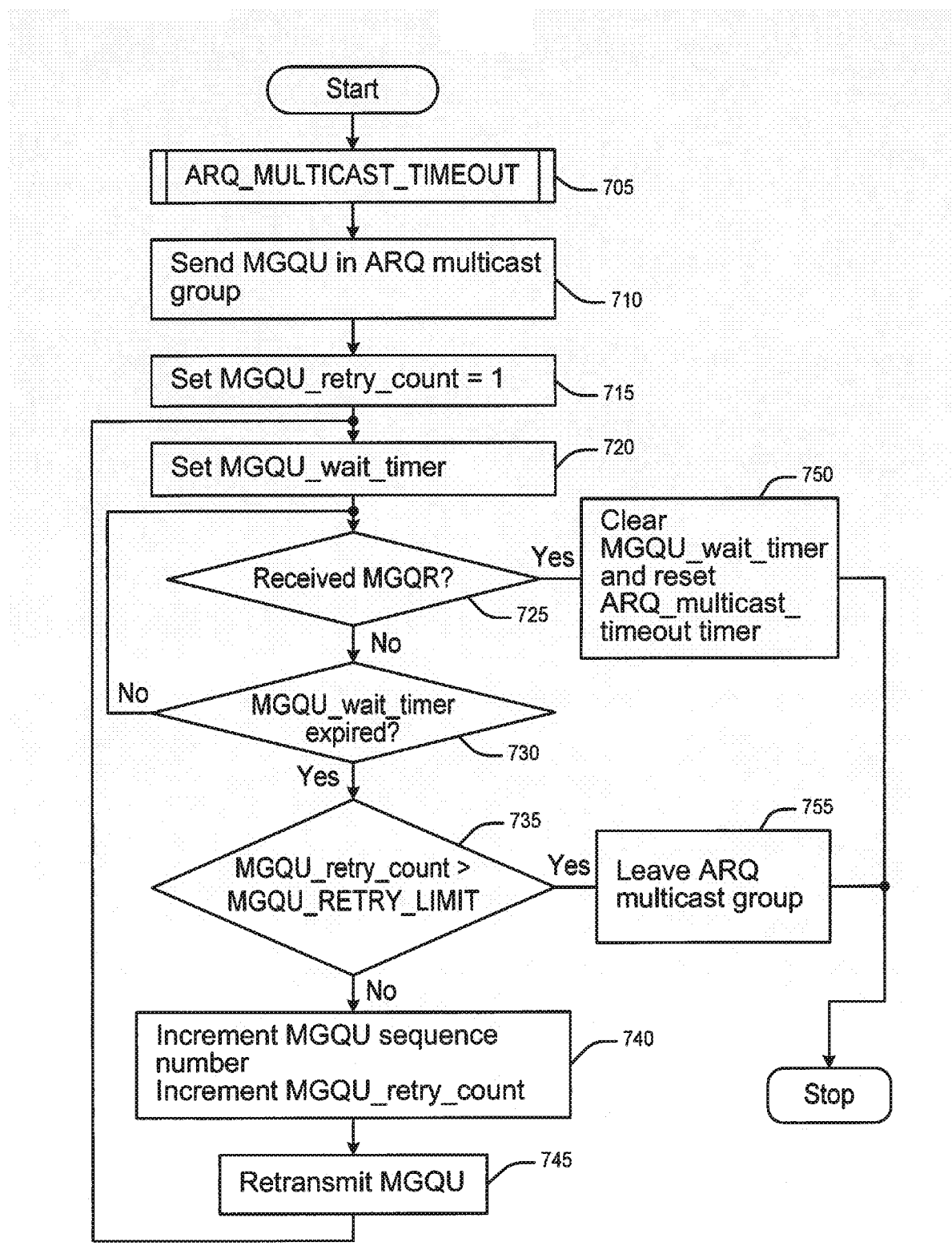
FIG. 7 is a flowchart depicting an exemplary method in accordance with the principles of the present invention for an ARQ server to query an ARQ multicast group.

FIG. 7 is a flowchart depicting an exemplary method in accordance with the principles of the present invention for an ARQ server to query an ARQ multicast group. The ARQ server is notified that the ARQ_MULTICAST_TIMEOUT has expired at 705. The expiration of the ARQ_MULTICAST_TIMEOUT indicates that the ARQ server has joined the ARQ multicast group but has not received any ARQ requests from this ARQ multicast group for the period of the ARQ_MULTICAST_TIMEOUT. At 710, the ARQ server sends a Multicast_Group_Query (MGQU) message to this ARQ multicast group. The MGQU message is used to query whether there is any client currently in this ARQ multicast group. The MGQU message contains the address of ARQ server, the ARQ multicast address, the message ID, the message sequence number, etc. The ARQ server initializes the Multicast_Group_Query_retry_count at 715 and sets the Multicast_Group_Query_wait_timer at 720. The Multicast_Group_Query_wait_timer is a timer, whose expiration time is MGQU_RETRIES_INTERVAL. After sending a MGQU, the ARQ server waits for the Multicast_Group_Query_Reply (MGQR) message. A test is performed at 725 to determine if the Multicast_Group_Query_Reply has been received. If the Multicast_Group_Query_Reply has not been received then a test is performed at 730 to determine if the Multicast_Group_Query_wait_timer has expired. If the Multicast_Group_Query_wait_timer has expired then a test is performed at 735 to determine if the Multicast_Group_Query_retry_count (MGQU_retry_count) is greater than a predetermined MULTICAST_GROUP_QUERY_RETRY_LIMIT (MGQU_RETRY_LIMIT). If the Multicast_Group_Query_retry_count is less than or equal to the MGQU_RETRY_LIMIT, then the Multicast_Group_Query sequence number and the Multicast_Group_Query_retry_count are incremented at 740. The Multicast_Group_Query is retransmitted at 745. Processing then proceeds to 720. If the Multicast_Group_Query_Reply has been received then the Multicast_Group_Query_wait_timer is cleared and the ARQ_MULTICAST_TIMEOUT timer is reset at 750. If the Multicast_Group_Query_retry_count is greater than the MGQU_RETRY_LIMIT, then the ARQ leaves this ARQ multicast group at 755.

Figure 8:
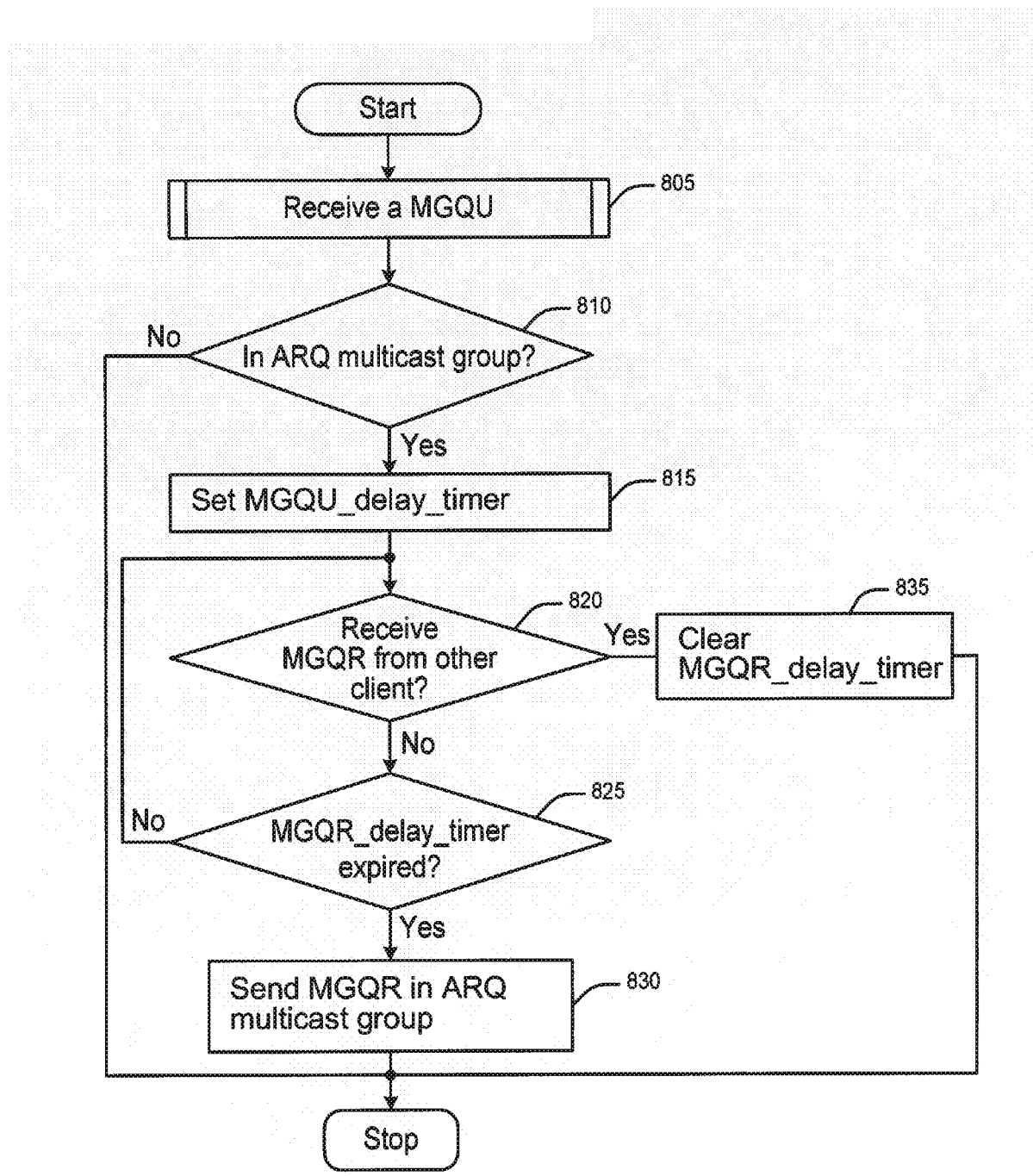
FIG. 8 is a flowchart illustrating an exemplary method in accordance with the principles of the present invention for a client to process an ARQ multicast group query from the ARQ server.

FIG. 8 is a flowchart illustrating an exemplary method in accordance with the principles of the present invention for a client to process an ARQ multicast group query from the ARQ server. The client receives an ARQ multicast group query from the ARQ server at 805. A test is performed at 810 to determine if the client is still a member of the ARQ multicast group specified in the ARQ multicast group query. If the client is still a member of the multicast group specified in the ARQ multicast group query then the client sets the Multicast_Group_Query_Reply_delay_timer (MGQR_delay_timer) at 815. A test is performed at 820 to determine if the client has received any other Multicast_Group_Query_Replys from any other clients in the cell. If the client has not received any other Multicast_Group_Query_Replys from any other clients in the cell, then a test is performed at 825 to determine if the Multicast_Group_Query_Reply_delay_timer has expired. If the Multicast_Group_Query_Reply_delay_timer has expired then a Multicast_Group_Query_Reply is sent to the ARQ multicast group at 830. If the Multicast_Group_Query_Reply_delay_timer has not expired (at 825), then processing proceeds to 820. If the client has received other Multicast_Group_Query_Replys from any other clients in the cell, then the client clears the Multicast_Group_Query_Reply_delay_timer at 835. If the client is no longer (or has not been) a member of the ARQ multicast group specified in the ARQ multicast group query then the client ignore the ARQ multicast group query.

The Multicast_Group_Query_Reply_delay_timer is a random delay timer, where Multicast_Group_Query_Reply_delay_timer (0<MGQR_delay_timer<MGQR_DELAY_LIMIT). This delay effectively randomizes the time to send the Multicast_Group_Query_Reply (MGQR). The MGQR is transmitted to the ARQ multicast address from the client to all the participants (ARQ server and other clients in the ARQ multicast group). Within the delay period, a client may receive a MGQR from another client in the same ARQ multicast group. If such a MGQR is received during the delay period, this client will cancel its delay timer and will not send its MGQR. MGQR contains the client address, the ARQ multicast group address, the original MGQU message sequence number that this MRGR replies to, etc.

The ARQ_MULTICAST_TIMEOUT, MGQU_RETRIES_INTERVAL, MGQU_RETRY_LIMIT, and MGQR_DELAY_LIMIT are the parameters that can be configured.

In an alternative embodiment, the client of a multicast program X sends the ARQ request in a cell independent control multicast group of the multicast program X if the client has not received the registration reply message from the ARQ server and/or if the client has not received any retransmitted packets from the ARQ server in the cell dependent ARQ multicast group. The cell independent control multicast group uses a common control channel.

The address of the cell independent control multicast group for the multicast program X, cx(31), cx(30), . . . cx(m+1), cx(m), cx(m−1), . . . cx0 can be assigned and configured at the multicast server, ARQ server, and clients. In an alternative method, the cell independent control channel address for multicast program X can be contained in a Session Description File. The session description file can be downloaded by the client through the HTTP or RTSP protocol at the session start or announced by the multicast server or a separate directory server. In another alternative method, the cell independent control channel address of program X is deduced from the source multicast address of program X, for example, cx(31)=bx(31), cx(30)=bx(30), . . . cx(m+1)=bx(m+1), cx(m)= Abx(m), cx(m−1)=0, . . . cx0=0.

Figure 9:
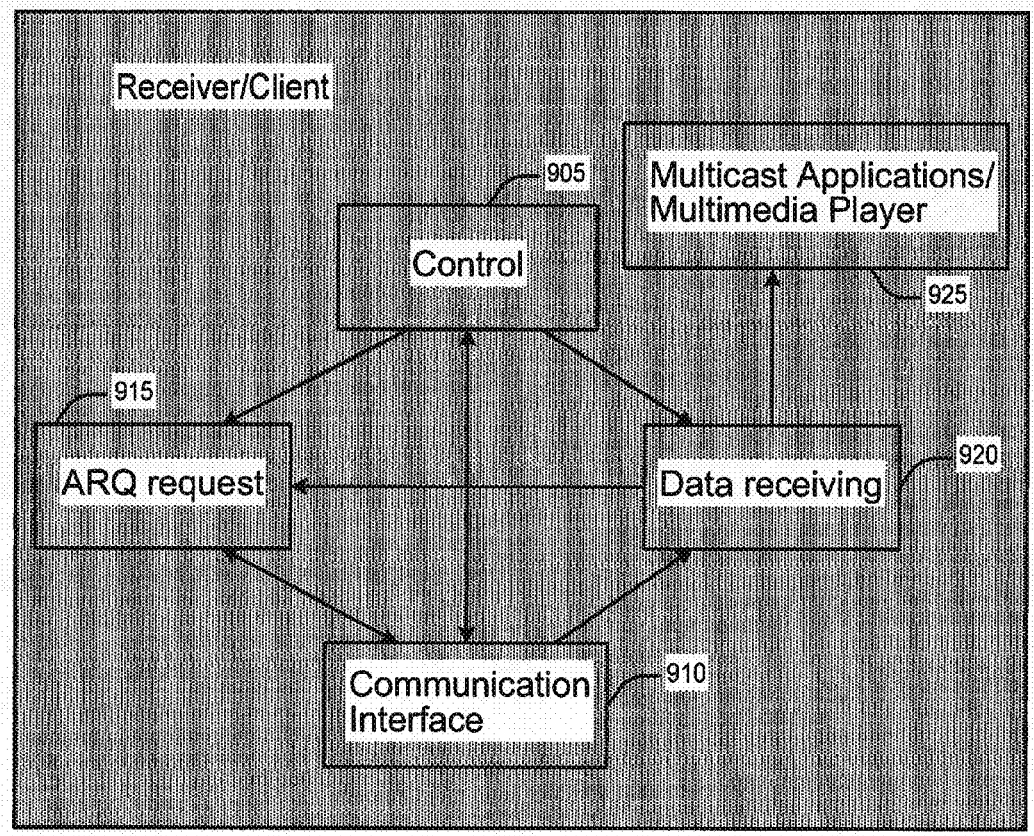
FIG. 9 is a block diagram of an exemplary client/receiving device in accordance with the principles of the present invention.

FIG. 9 is a block diagram of an exemplary client/receiving device in accordance with the principles of the present invention. The control module 905 is responsible for obtaining the source multicast address and ARQ multicast address for a program. It is also responsible for registering itself to the ARQ server, including sending a registration message and processing the registration reply, receiving the multicast group query (MGQU) messages, processing MGQU messages, and sending the multicast group query reply (MGQR) via the communication interface 910. It informs the ARQ request module 915 of the address to send the ARQ request, and informs the data receiving module 920 the addresses to receive the source data and retransmitted data. The data receiving module 920 receives the source data and the retransmitted data via the communication interface 910. The data receiving module 920 informs the ARQ request module 915 of any data loss. The data receiving module 920 forwards the received data to the multicast application/multimedia player module 925. The ARQ request module 915 determines if an ARQ request is necessary and what to request and sends the ARQ request to the ARQ server via the communication interface 910. The ARQ request module 915 also listens to the ARQ requests from other clients via the communication interface 910.

Figure 10:
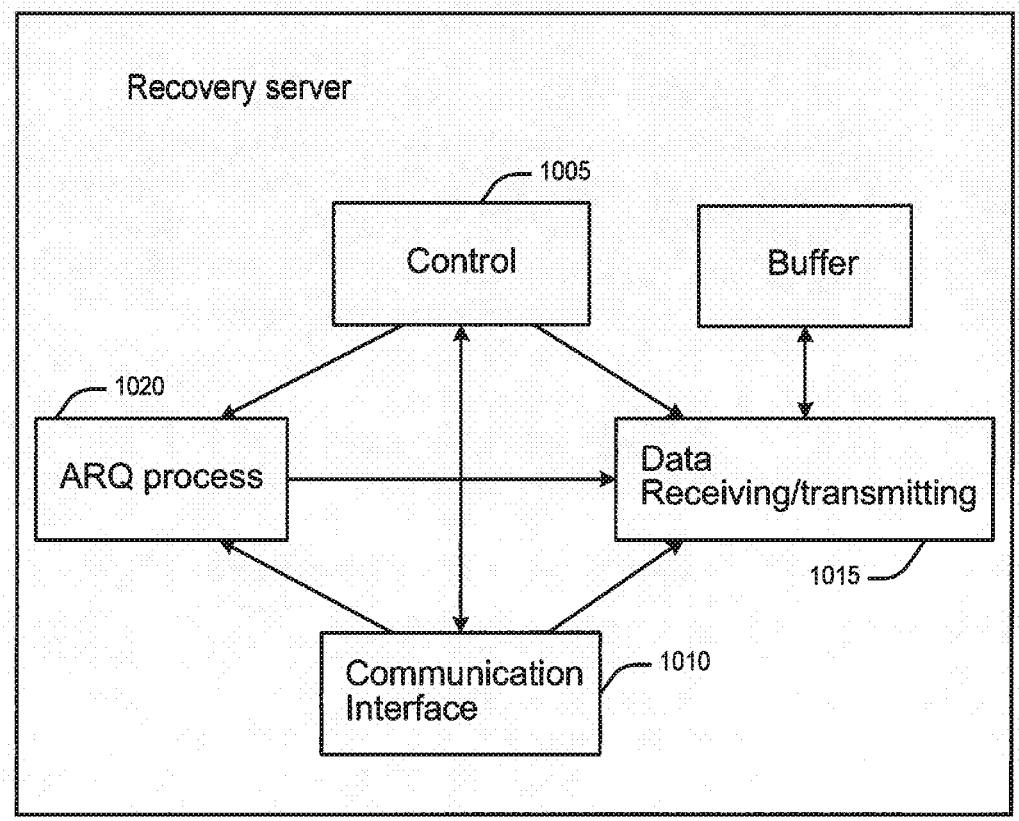
FIG. 10 is a block diagram of an exemplary recovery server/ARQ server in accordance with the principles of the present invention.

FIG. 10 is a block diagram of an exemplary recovery server/ARQ server in accordance with the principles of the present invention. The control module 1005 is responsible for client registration, including receiving and processing the client registration request, joining the multicast group and sending registration reply via the communications interface 1010. The control module 1005 is also responsible for querying whether there are any clients using an ARQ multicast group, including sending MGQUs, receiving MGQRs from the clients via the communication interface 1010, and processing the MGQR messages and determining if the ARQ server should leave this ARQ multicast group. The control module 1005 commands the data receiving/transmitting module 1015 to receive the data for a program (via the communications interface 1010) and stores the data in a buffer. The data receiving/transmitting module 1015 then receives the data for a program (via the communications interface 1010) and stores the data in the buffer. The control module 1005 advises the ARQ process module 1020 of the ARQ multicast address. The ARQ process module 1020 receives the ARQ request via the communications interface 1010 and processes the ARQ request. The ARQ process module 1020 requests the data receiving/transmitting module 1015 to retransmit the lost packets to the client/receiving device. It is to be understood that the present invention may be implemented in various forms of hardware (e.g. ASIC chip), software, firmware, special purpose processors, or a combination thereof, for example, within a server, an intermediate device (such as a wireless access point or a wireless router) or mobile device. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, said method comprising:
   receiving a registration message in unicast;
   transmitting a reply to said registration message in unicast;
   receiving a recovery request message from a client in a multicast group;
   transmitting recovery data in multicast to the multicast group responsive to said recovery request message, wherein said recovery request message includes instructions determining that said recovery data comprises one of forward error correction packets or source data or both forward error correcting data and source data;
   transmitting a message to the multicast group to determine status of said recovery multicast group; and
   receiving notification that a recovery timeout has occurred.

2. The method according to claim 1, further comprising:
   determining if a recovery multicast group specified in said registration message has already been joined; and
   joining said recovery multicast group if said recovery multicast group has not already been joined.

3. The method according to claim 1,
   determining if a recovery multicast group specified in said recovery request message has already been joined; and
   joining said recovery multicast group if said recovery multicast group has not already been joined.

4. An apparatus, comprising:
   means for receiving a registration message in unicast;
   means for transmitting a reply to said registration message in unicast;
   means for receiving a recovery request message from a client in a multicast group;
   means for transmitting recovery data in multicast to the multicast group responsive to said recovery request message, wherein said recovery request message includes instructions determining that said recovery data comprises one of forward error correction packets or source data or both forward error correcting data and source data;
   means for transmitting a message to the multicast group to determine status of said recovery multicast group; and
   means for receiving notification that a recovery timeout has occurred.

5. The apparatus according to claim 4, further comprising:
   means for determining if a device is a member of a recovery multicast group; and
   means for leaving said recovery multicast group, and wherein said leaving is performed if no other devices have replied to said recovery multicast group message and a delay time has expired.

6. The apparatus according to claim 4, further comprising:
   means for determining if a recovery multicast group specified in said registration message has already been joined; and
   means for joining said recovery multicast group if said recovery multicast group has not already been joined.

7. The apparatus according to claim 4,
   means for determining if a recovery multicast group specified in said recovery request message has already been joined; and
   means for joining said recovery multicast group if said recovery multicast group has not already been joined.

8. A recovery server, comprising:
   a control module in communication with a communcations interface, said control module receiving a registration message;
   said control module in communication with said communications interface, transmitting a reply to said registration message;
   said control module in communication with said communications interface, receiving a recovery request message;
   an automatic repeat request process module in communication with a data receiving and transmiting module which is in communication with said communications interface, transmitting recovery data responsive to said recovery request message, wherein said transmission of said recovery data is retransmission of forward error correction packets or retransmission of source data or retransmission of both said forward error correcting data and said source data;

said automatic repeat request process module in communication with said data receiving and transmiting module which is in communication with said communications interface, transmitting a message to a recovery multicast group to determine status of said recovery multicast group; and said control module in communication with said communications interface, receiving notification that a recovery timeout has occurred.

9. The recovery server according to claim 8, further comprising:

said control module determining if a device is a member of a recovery multicast group; and said control module in communication with said communications interface, leaving said recovery multicast group, and wherein said leaving is performed if no other devices have replied to said recovery multicast group message and a delay time has expired.

10. The recovery server according to claim 8, further comprising:

said control module determining if a recovery multicast group specified in said registration message has already been joined; and said control module joining said recovery multicast group if said recovery multicast group has not already been joined.

11. The recovery server according to claim 4, further comprising said control module determining if a recovery multicast group specified in said recovery request message has already been joined; and said control module joining said recovery multicast group if said recovery multicast group has not already been joined.

\* \* \* \* \*